United States Patent [19]
Kavesh et al.

[11] Patent Number: 5,972,498
[45] Date of Patent: *Oct. 26, 1999

[54] SHAPED POLYETHYLENE ARTICLES OF INTERMEDIATE MOLECULAR WEIGHT AND HIGH MODULUS

[75] Inventors: Sheldon Kavesh, Whippany; Dusan Ciril Prevorsek, Morristown, both of N.J.

[73] Assignee: AlliedSignal Inc., Morristown, N.J.

[*] Notice: This patent is subject to a terminal disclaimer.

[21] Appl. No.: 09/046,317

[22] Filed: Mar. 23, 1998

Related U.S. Application Data

[62] Division of application No. 08/520,328, Aug. 25, 1995, Pat. No. 5,736,244, which is a continuation of application No. 08/107,421, Aug. 16, 1993, abandoned, which is a continuation of application No. 07/629,183, Dec. 21, 1990, abandoned, which is a continuation of application No. 07/241,800, Sep. 6, 1988, abandoned, which is a continuation of application No. 06/812,709, Dec. 23, 1985, abandoned, which is a division of application No. 06/690,914, Jan. 11, 1985, Pat. No. 4,663,101.

[51] Int. Cl.⁶ .................................................. D02G 3/00
[52] U.S. Cl. ........................ 428/364; 428/394; 428/500; 526/348.1
[58] Field of Search ................................. 428/364, 369, 428/359, 394, 500; 526/348.1

[56] References Cited

U.S. PATENT DOCUMENTS

| | | | |
|---|---|---|---|
| 3,017,238 | 11/1962 | Levine et al. ........................... | 264/203 |
| 3,048,465 | 8/1962 | Jugeleit ...................................... | 18/64 |
| 3,210,452 | 10/1965 | Howard .................................. | 264/203 |
| 3,846,404 | 11/1974 | Nichols .................................... | 264/41 |
| 3,962,205 | 6/1976 | Ward et al. ............................. | 526/352 |
| 4,228,118 | 10/1980 | Wu et al. ............................. | 264/210.8 |
| 4,254,072 | 3/1981 | Capaccio et al. ...................... | 264/210 |
| 4,268,470 | 5/1981 | Capaccio et al. ...................... | 528/502 |
| 4,276,348 | 6/1981 | Wu et al. ................................ | 428/373 |
| 4,403,012 | 9/1983 | Harpell et al. .......................... | 428/290 |
| 4,413,110 | 11/1983 | Kavesh et al. ......................... | 526/348.1 |
| 4,415,525 | 11/1983 | Capaccio et al. ...................... | 264/210 |
| 4,422,993 | 12/1983 | Smith et al. ............................ | 264/210 |
| 4,430,383 | 2/1984 | Smith et al. ............................ | 428/364 |
| 4,436,689 | 3/1984 | Smith et al. ............................ | 264/204 |
| 4,455,273 | 6/1984 | Kavesh et al. ......................... | 264/184 |
| 4,501,856 | 2/1985 | Harpell et al. .......................... | 428/290 |
| 4,530,809 | 7/1985 | Shindo et al. ....................... | 264/210.7 |
| 4,536,536 | 8/1985 | Kavesh et al. ......................... | 264/184 |
| 4,551,296 | 11/1985 | Kavesh et al. . | |
| 4,584,347 | 4/1986 | Kavesh et al. . | |
| 4,599,267 | 7/1986 | Kwon et al. ............................ | 428/364 |
| 4,663,101 | 5/1987 | Kavesh et al. ......................... | 264/178 |
| 5,736,244 | 4/1998 | Kavesh et al. ......................... | 428/364 |

FOREIGN PATENT DOCUMENTS

| | | |
|---|---|---|
| 621695 | 6/1981 | Canada . |
| 064 167 | 11/1982 | European Pat. Off. . |
| 077 590 | 4/1983 | European Pat. Off. . |
| 110 021 | 6/1984 | European Pat. Off. . |
| 115192 | 8/1984 | European Pat. Off. . |
| 2330716 | 11/1976 | France . |
| 2448587 | 2/1980 | France . |
| 3004699 | 8/1980 | Germany . |
| 472051 | 1/1937 | United Kingdom . |
| 851979 | 10/1960 | United Kingdom . |
| 1100497 | 1/1968 | United Kingdom . |
| 2042414 | 9/1980 | United Kingdom . |
| 2051667 | 1/1981 | United Kingdom . |

OTHER PUBLICATIONS

"Polymer Communications", Polymer Bulletin, Kalb and Pennings, vol. 1, pp. 879–880 (1979).
"Material Strength and Drawing Mechanism of Hot Drawn High Molecular Weight Polyethylene", Journal of Materials Science, Kalb & Pennings vol. 15 pp. 2584–2590 (1980).
"Phase Separation Spinning of Polyvinyl Alcohol Fibers", M.M. Zwick, J.A. Duiser, and C. Van Bouchove, pp. 188–207. (Soc. Chem. Indy, London) Monograph, No. 30, 1986.
"Spinning of Fibers from Polymer Solutions Undergoing Phase Separation . . .", M.M. Zwick, Applied Polymer Symposia, No. 6, pp. 109–149 (1967).
"Influence of Spinning/Hot Drawing Conditions on the Tensile Strength of Porous High Molecular Weight Polyethylene", Polymer Bulletin, vol. 2, pp. 775–783, (1980).

*Primary Examiner*—William Krynski
*Assistant Examiner*—Jill M. Gray

Attorney, Agent, or Firm—Virginia S. Andrews; Melanie L. Brown; Roger H. Criss

[57] ABSTRACT

Solutions of intermediate molecular weight polymers from about 200,000 to about 4,000,000, such as polyethylene, in a relatively non-volatile solvent are extruded through an aperature at constant concentration and thereafter stretched at a ratio of at least about 3:1 prior to cooling to form a first gel. The first gels are extracted with a volatile solvent to form a second gel, and the second gel is dried to form a low porosity xerogel. Stretching occurs with any one or more of the first gel, second gel or xerogel. The polyethylene products produced by our process include products having a molecular weight between about 200,000 and about 4,000,000 a tenacity of at least about 13 grams/denier, a modulus of at least about 350 gram/denier, a porosity of less than 10% by volume, a crystalline orientation function of at least about 0.95, and a main melting temperature of at least about 140° C.

2 Claims, 3 Drawing Sheets

FIG. 1

SHAPED POLYETHYLENE ARTICLES OF INTERMEDIATE MOLECULAR WEIGHT AND HIGH MODULUS

This is a divisional application of pending application Ser. No., 08/520,328, filed Aug. 25, 1995 (now U.S. Pat. No. 5,736,244), which is a continuation of application Ser. No. 08/107,421, filed Aug. 16. 1993 (abandoned), which is a continuation of application Ser. No. 07/629,183, filed Dec. 21, 1990 (abandoned), which is a continuation of application Ser. No. 07/241,800 filed Sep. 6, 1988 (abandoned), which is a continuation of application Ser. No. 06/812,709 filed Dec. 23, 1985 (abandoned), which is a divisional of application Ser. No. 06/690,914 filed Jan. 11, 1985 (now U.S. Pat. No. 4,663,101).

BACKGROUND OF THE INVENTION

The present invention relates to intermediate molecular weight shaped polyethylene articles such as polyethylene fibers exhibiting relatively high tenacity, modulus and toughness, and to products made therefrom. The polyethylene article is made by a process which includes the step of stretching a solution of polyethylene dissolved in a solvent at a stretch ratio of at least about 3:1.

Polyethylene fibers, films and tapes are old in the art. An early patent on this subject appeared in 1937 (G.B. 472,051). However, until recently, the tensile properties of such products have been generally unremarkable as compared to competitive materials, such as the polyamides and polyethylene terephthalate. Recently, several methods have been discovered for preparing continuous low and intermediate molecular weight polyethylene fibers of moderate tensile properties. Processes for the production of relatively low molecular weight fibers (a maximum weight average molecular weight, Mw, of about 200,000 or less) have been described in U.S. Pat. Nos. 4,276,348 and 4,228,118 to Wu and Black, U.S. Pat. Nos. 3,962,205, 4,254,072, 4,287,149 and 4,415,522 to Ward and Cappaccio, and U.S. Pat. No. 3,048,465 to Jurgeleit. U.S. Pat. No. 4,268,470 to Cappaccio and Ward describes a process for producing intermediate molecular weight polyolefin fibers (minimum molecular weight of about 300,000).

The preparation of high strength, high modulus polyolefin fibers by solution spinning has been described in numerous recent publications and patents. German Off. No. 3,004,699 to Smith et al. (Aug. 21, 1980) describes a process in which polyethylene is first dissolved in a volatile solvent, the solution is spun and cooled to form a gel filament, and, finally, the gel filament is simultaneously stretched and dried to form the desired fiber. U.K. Patent Application No. 2,051,667 to P. Smith and P. J. Lemstra (Jan. 21, 1981) discloses a process in which a solution of a polymer is spun and the filaments are drawn at a stretch ratio which is related to the polymer molecular weight, at a drawing temperature such that at the draw ratio used, the modulus of the filaments is at least 20 GPa (the application notes that to obtain the high modulus values required, drawing must be performed below the melting point of the polyethylene; in general, at most 135° C.). Kalb and Pennings in *Polymer Bulletin*, Volume 1, pp. 879–80 (1979), *J. Mat. Sci.*, Vol. 15, pp. 2584–90 (1980) and Smook et al. in *Polymer Mol.*, Vol 2, pp. 775–83 (1980) describe a process in which the polyethylene is dissolved in a non-volatile solvent (paraffin oil), the solution is cooled to room temperature to form a gel which is cut into pieces, fed to an extruder and spun into a gel filament, the gel filament being extracted with hexane to remove the parafin oil, vacuum dried and stretched to form the desired fiber.

Most recently, ultra high molecular weight fibers have been disclosed. U.S. Pat. No. 4,413,110 to Kavesh and Prevorsek describes a solution spun fiber of from 500,000 molecular weight to about 8,000,000 molecular weight which exhibits exceptional modulus and tenacity. U.S. Pat. Nos. 4,430,383 and 4,422,993 to Smith and Lemstra also describe a solution spun and drawn fibers having a minimum molecular weight of about 800,000. U.S. Pat. No. 4,436,689 to Smith, Lemstra, Kirschbaum and Pijers describes solution spun filaments of molecular weight greater than 400,000 (and an Mw/Mn<5). In addition, U.S. Pat. No. 4,268,470 to Ward and Cappacio also discloses high molecular weight polyolefin fibers.

In general, the known processes for forming polyethylene and other polyolefin fibers may be observed as belonging in one of two groups: those which describe fibers of low average molecular weight (200,000 or less) and those which describe fibers of high average molecular weight (800,000 or more). Between the two groups, there is a molecular weight range which has not been accessible to the prior art methods for preparing fibers of high tensile properties.

There are advantages to the molecular weight ranges thus far mastered. Lower molecular weight polymers are generally synthesized and processed into fibers more easily and economically than high molecular weight fibers. On the other hand, fibers spun from high molecular weight polymers may possess high tensile properties, low creep, and high melting point. A need exists for fibers and methods which bridge this gap, combining good economy with moderate to high tensile properties. Surprisingly, our process makes it possible to accomplish these results.

BRIEF DESCRIPTION OF THE INVENTION

The present invention is directed to novel shaped polyethylene articles having a weight average molecular weight between about 200,000 and about 4,000,000, a crystalline orientation function of at least about 0.95, a tensile modulus of at least about 350 grams/denier, a tenacity of at least about 13 grams/denier, and a main melting temperature of at least about 140° C. (measured at 10° C./minute heating rate by differential scanning calorimetry), said main melting temperature being greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1.

The present invention is directed to novel shaped polyethylene articles having a weight average molecular weight between about 200,000 and about 800,000, a crystalline orientation function of at least about 0.95, a tensile modulus of at least about 350 grams/denier, a tenacity of at least about 13 grams/denier, and a main melting temperature of at least about 140° C. (measured at 10° C./minute heating rate by differential scanning calorimetry), said main melting temperature being greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1.

The present invention is also drawn to novel shaped polyethylene articles having a weight average molecular weight between about 250,000 and 750,000, a crystalline orientation function of at least about 0.95, a tensile modulus of at least about 500 grams/denier, a tenacity of at least about 15 grams/denier, and a main melting temperature of at least about 141° C. (measured at 10° C./minute heating rate by differential scanning calorimetry), said main melting temperature being greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1.

The present invention also includes novel shaped polyethylene articles of substantially indefinite length having a weight average molecular weight between about 250,000 and 750,000, a crystalline orientation function of at least about 0.95, a tensile modulus of at least about 750 grams/denier, a tenacity of at least about 18 grams/denier, and a main melting temperature of at least about 141° C. (measured at 10° C./minute heating rate by differential scanning calorimetry), said main melting temperature being greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1.

The present invention also includes novel shaped polyethylene articles of substantially indefinite length having a weight average molecular weight between about 300,000 and 700,000, a crystalline orientation function of at least about 0.95, a tensile modulus of at least about 750 grams/denier, a tenacity of at least about 20 grams/denier, and a main melting temperature of at least about 141° C. (measured at 10° C./minute heating rate by differential scanning calorimetry), said main melting temperature being greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1.

The present invention is also drawn to a shaped polyethylene article having a weight average molecular weight between about 200,000 and about 4,000,000 a tensile modulus of at least about 350 grams/denier, a transverse microfibrillar spacing which is less than a transverse microfibrillar spacing of a shaped polyethylene article of substantially the same weight average molecular weight produced from a polymer solution of substantially the same polymer concentration, spun at substantially the same throughput rate and subjected to solution stretching at a ratio of less than about 3:1, a tenacity of at least about 13 grams/denier, and a main melting temperature of at least about 140° C. measured at 10° C./minute heating rate by differential scanning calorimetry).

The present invention is also directed to novel shaped polyethylene articles having a weight average molecular weight greater than about 200,000 and less than 500,000 a crystalline orientation function of at least about 0.95, a tensile modulus of at least about 350 grams/denier, a tenacity of at least about 13 grams/denier, and a main melting temperature of at least about 140° C. (measured at 10° C./minute heating rate by differential scanning calorimetry).

The present invention also includes a process for producing shaped polyethylene articles, for example fibers, which comprises the steps of:

(a) forming, at a first temperature, a solution of polyethylene in a first solvent, said polyethylene having a weight average molecular weight between about 200,000 and 4,000,000 kilograms/kg mole;

(b) extruding said solution through an aperature to form a solution product, said solution product being at a temperature no less than said first temperature;

(c) stretching the solution product at a stretch ratio of at least about 3:1;

(d) cooling the solution product to a second temperature below the first temperature to form a first gel containing first solvent;

(e) extracting the first solvent from the first gel with a second solvent to form a second gel containing second solvent, substantially free of the first solvent;

(f) drying the gel containing the second solvent to form a xerogel substantially free of solvent; and, (g) stretching at least one of the first gel, the second gel and the xerogel, the total stretch ratio being sufficient to achieve a polyethylene article having a tenacity of at least about 13 grams/denier, a porosity of less than 10% by volume, and a modulus of at least about 350 grams/denier.

DETAILED DESCRIPTION OF THE INVENTION

There are many applications which require load bearing elements of high strength, modulus, toughness, dimensional and hydrolytic stability.

For example, marine ropes and cables, such as the mooring lines used to secure tankers to loading stations and the cables used to secure drilling platforms to underwater anchorage, are presently constructed of materials such as nylon, polyester, aramids and steel which are subject to hydrolytic or corrosive attack by sea water. Consequently, such mooring lines and cables are constructed with significant safety factors and are replaced frequently. The greatly increased weight and the need for frequent replacement creates substantial operational and economic burdens.

The fibers and films of this invention exhibit relatively high strength, high modulus and very good toughness. Also, they are dimensionally and hydrolytically stable. The fibers and films prepared by our unique process possess these properties in a heretofore unattained combination and are, therefore, quite novel and useful materials. Consequently, our fibers and films offer significant advantages when employed as, for example, marine ropes and cables.

Other applications for the fibers and films of our invention include: reinforcement of thermoplastics, thermosetting resins, elastomers, and concretes for uses such as pressure vessels, hoses, power transmission belts, sports and automotive equipment; and, building construction materials.

The polymer used in the present invention is crystallizable polyethylene. By the term "crystallizable" is meant a polymer which is capable of exhibiting a relatively high degree of order when shaped, attributable in part to its molecular weight and high degree of linearity. As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 25 wt % of one or more polymeric additives such as alkene-1-polymers, in particular low density polyethylene, polypropylene or polybutylene, copolymers containing mono-olefins as primary monomers, oxidixed polyolefins, graft polyolefin copolymers and polyoxymethylenes, or low molecular weight additives such as anti-oxidants, lubricants, ultraviolet screening agents, colorants and the like which are commonly incorporated therewith. In the case of polyethylene, suitable polymers have molecular weights (by intrinsic viscosity) in the range of about 200,000 to about 4,000,000. This corresponds to a weight average chain length of 8,333 to 166,666 monomer units or 16,666 to 333,332 carbons. The preferred weight average molecular weight of polyethylene used in our process is between about 200,000 (3.2 IV) and about 800,000 (8.4 IV), more preferably between about 250,000 (3.7 IV) and 750,000 (8.0 IV), and most preferably between about 300,000 (4.2 IV) and about 700,000 (7.6 IV). The IV numbers represent intrinsic viscosity of the polymer in decalin at 135° C. In addition the polymers used in the present invention have a weight to number average molecular weight ratio (Mw/Mn) which is variable over a wide range. We prefer to use polymers with a Mw/Mn ratio of at least about 5:1 because polymers having a more narrow distribution range are more difficult to produce. In addition, we believe there may be unexpected advantages to using a higher ratio (i.e. $\geq 5:1$), particularly with a bimodal molecular weight distribution.

The first solvent should be a non-volatile solvent under the processing conditions. This is necessary in order to maintain essentially constant concentration of solvent upstream and through the aperture (die or spinnerette) and to prevent non-uniformity in liquid content of the gel fiber or film containing first solvent. Preferably, the vapor pressure of the first solvent should be no more than about one fifth of an atmosphere (20 kPa) at 175° C., or at the first temperature. Preferred first solvents for hydrocarbon polymers are aliphatic and aromatic hydrocarbons of the desired non-volatility and solubility for the polymer. Preferred first solvents for polyethylene include paraffin or mineral oil.

The polymer may be present in the first solvent in a first concentration which is selected from a range from about 5 to about 25 weight percent. The optimum concentration is dependent upon the polymer molecular weight. For a polymer of about 650,000 (Mw), the first concentration is preferably about 5 to about 15 weight percent and more preferably about 6 to about 10 weight percent; however, once chosen, the concentration should not vary adjacent the die or otherwise prior to cooling to the second temperature. The concentration should also remain reasonably constant over time (i.e., over the length of the fiber or film).

The first temperature is chosen to achieve complete dissolution of the polymer in the first solvent. The first temperature is the minimum temperature at any point between where the solution is formed and the die face, and must be greater than the gelation temperature for the polymer in the solvent at the first concentration. For polyethylene in paraffin oil at 5 to 15 weight percent concentration, the gelation temperature is approximately 100–130° C.; therefore, a preferred temperature can be between 180° C. and 250° C., or more preferably between 200 and 240° C. While temperatures may vary above the first temperature at various points upstream of the die face, excessive temperatures causative of polymer degradation should be avoided. To assure complete solubility, a first temperature is chosen whereat the solubility of the polymer exceeds the first concentration, and is typically at least 100 percent greater. The second temperature is chosen whereat the solubility of the polymer is much less than the first concentration. Preferably, the solubility of the polymer in the first solvent at the second temperature is no more than about 1% percent of the first concentration. Cooling of the extruded polymer solution from the first temperature to the second temperature should be accomplished at a rate sufficiently rapid to form a gel fiber which has substantially the same polymer concentration as existed in the polymer solution. Preferably, the rate at which the extruded polymer solution is cooled from the first temperature to the second temperature should be at least about 50° C./minute.

A critical aspect of our invention is the step of stretching (solution stretching) the extrudate (solution product) at a ratio of at least about 3:1 and up to about 200:1. The preferred ratio of stretching depends upon the polymer molecular weight and the first concentration. For a polymer of about 650,000 (Mw) at a first concentration between about 6% and about 10%, the preferred stretch ratio is between about 3:1 and about 50:1 and the most preferred ratio of stretching is between about 10:1 and about 50:1. Solution stretching, i.e., stretching the spun solution product prior to forming a gel therefrom, occurs between the aperture of the die and the quench bath (normally within the space of a few inches). Stretching can be accomplished by regulating the spinning rate (measured by the length of product formed per unit time) through the die relative to the angular velocity of the quench bath roller. Solution stretching of at least about 3:1 results in the formation of a gel (upon cooling to the second temperature) which consist of continuous polymeric networks highly swollen with solvent. Each gel has substantially uniform polymer density with polymer voids constituting less than 10% (by volume), normally less than 5%, of the fiber. A solution stretch ratio of at least about 3:1 unexpectedly aids in forming high strength articles of intermediate molecular weight (cf. U.S. Pat. No. 4,413,110). Within the limitations of the solution stretch ratio range, the higher the pump rate of polymer through the die or spinnerette, the lower the solution stretch ratio because of the degree of alignment (orientation) imparted by shear through the die or spinnerette.

The extraction with second solvent is conducted in a manner (ordinarily in a washer cabinet) that replaces the first solvent in the gel with second solvent without significant changes in gel structure. Some swelling or shrinkage of the gel may occur, but preferably no substantial dissolution, coagulation or precipitation of the polymer occurs. When the first solvent is a hydrocarbon, suitable second solvents include hydrocarbons, chlorinated hydrocarbons, chlorofluorinated hydrocarbons and others, such as pentane, hexane, heptane, toluene, methylene chloride, carbontetrachloride, trichlorotrifluoroethane (TCTFE), diethyl ether and dioxane. The most preferred second solvents are methylene chloride (B.P. 39.8° C.) and TCTFE (B.P. 47.5° C.). Preferred second solvents are the non-flammable volatile solvents having an atmospheric boiling point below about 80° C., more preferably below about 70° C. and most preferably below about 50° C. Conditions of extractions should be chosen so as to remove the first solvent to a level of less than 0.1 percent of the total solvent in the gel.

A preferred combination of the conditions is a first temperature between about 150° C. and about 250° C., a second temperature between about minus 40° C. and about 40° C. and a cooling rate between the first temperature and the second temperature at least about 50° C./minute. Most preferably, the first solvent does not experience a phase change at the second temperature. It is preferred that the first solvent be a hydrocarbon, when the polymer is a polyolefin such as intermediate molecular weight polyethylene. The first solvent should be substantially non-volatile, one measure of which is that its vapor pressure at the first temperature should be less than 20 kPa, and more preferably less than 2 kPa.

In choosing the first and second solvents, the primary desired difference relates to volatility as discussed above. It is also preferred that the polymers be less soluble in the second solvent at about 40° C. than in the first solvent at about 150° C. Once the gel containing second solvent is formed, the second gel is then dried under conditions where the second solvent is removed leaving the solid network of polymer substantially intact. By analogy to silica gels, the resulting material is called a "xerogel" meaning a solid matrix corresponding to a solid matrix of a wet gel, with the liquid having been replaced by gas (e.g., by in inert gas such as nitrogen or by air). The term "xerogel" is not intended to delineate any particular type of surface area, degree of porosity or pore size.

Stretching may be performed upon the gel after cooling to the second temperature, or during or after extraction. Alternatively, stretching of the xerogel may be conducted, or a combination of gel stretching and xerogel stretching may be preformed. Stretching after gelation most preferably is conducted in two or more stages. The first stage of stretching may be conducted at room temperature or at an elevated temperature, ordinarily at a temperature between about 115° C. and 135° C. Preferably, stretching is conducted in the last of the stages at a temperature between about 120° C. and 155° C. Most preferably, the stretching is conducted in the last of the stages at a temperature between about 135° C. and 150° C.

The stretching which occurs subsequent to gelation is another critical aspect of our invention. Stretching subsequent to gelation can be accomplished during quenching, washing, and/or drying of the gels, and can also be accomplished by a xerogel stretching step. As noted above, stretching subsequent to gelation most preferably occurs in at least two stages. The amount of acceptable stretching subsequent to gelation at various stages of the process is as follows: stretching of the gels is normally at least about 1.5:1; stretching of the xerogel in a first stage, preferably occurring between 115° C. and 135° C., is generally more than about 2:1; and stretching of the xerogel in a second stage, preferably occurring between about 130° C. and 155° C., is normally about 1.5:1.

With a solution stretch ratio of at least about 3:1 and at least one subsequent stretching operation, the overall stretch ratio of the product is between about 30:1 and about 500:1 or more. The total combined stretch ratio (of the solution product, the gel and/or the xerogel) of at least about 30:1 produces novel articles exhibiting a unique combination of properties. Furthermore, the stretching steps of the process are interrelated in such a fashion that an increase in the solution stretch ratio is coupled with a decrease in the subsequent gel and/or xerogel stretch ratios. The Examples described hereinbelow illustrate how the stretch ratios are interrelated in obtaining particular improved fiber properties.

The intermediate weight polyethylene articles, such as fibers, produced by the present process are novel in that they exhibit a unique combination of properties: a tensile modulus at least about 350 grams/denier (preferably at least about 500 grams/denier, more preferably at least about 750 grams/denier, and most preferably at least about 1,000 grams/denier), a tenacity at least about 13 grams/denier (preferably at least about 15 grams/denier, more preferably at least about 18 grams/denier and most preferably at least about 20 grams/denier), a main melting temperature (measured at 10° C./minute heating rate by differential scanning calorimetry) of at least about 140° C., preferably at least about 141° C., and wherein said main melting temperature is greater than the main melting temperature of a shaped polyethylene article of substantially the same weight average molecular weight produced from a polymer solution of substantially the same polymer concentration, spun at substantially the same throughput rate and subjected to solution stretching at a ratio of less than about 3:1, a porosity of less than 10% by volume (normally less than 5%), and a crystalline orientation function $(f)_c$ of at least about 0.95. Preferably, the article has an ultimate elongation (UE) at most of about 7 percent, and more preferably not more than about 5 percent. In addition, the articles have a high toughness and uniformity. Moreover and very importantly, the products produced by our process exhibit a transverse microfibrillar spacing less than that which would occur in an article of the same molecular weight having been produced by a process which subjects a solution product to a solution stretch of less than about 3:1.

The crystalline orientation function is a measurement of the degree of alignment of the axis of the polymer crystals with the major axis of the product. It has been shown that the higher the crystalline orientation function the higher the tensile strength of the product. The crystalline orientation function is mathematically calculated from the equation reported by R. S. Stein, *J. Poly. Sci.*, 31, 327 (1958):

$$f_\varepsilon = \frac{1}{2}(3\langle\cos\theta\rangle^2 - 1)$$

where θ=the angle between the major axis of the product and the major axis of the crystals in the product. Perfectly oriented crystals, i.e. crystal having a major axis parallel to the major axis of the product, would exhibit an $f_c$=1. For polyethylene fibers produced by our novel process, the crystalline orientation function is at least about 0.95.

We have also employed infra-red techniques to determine the overall orientation function for a polyethylene product produced by our process. This technique is reported in detail in R. J. Samuels, *Structure of Polymers and Properties*, John Wiley and Sons, New York, 1974, pp. 63–82.

The degree of crystallinity of the product is related to the tensile strength in a similar fashion as the orientation factor. Crystallinity of the product can be measured by a variety of methods including x-ray diffraction, heat of fusion and density measurement and is at least about 0.70 or higher. By x-ray diffraction, we measured the degree of crystallinity of a fibrous product produced by our process to be about 0.65. However, density measurements of the same fiber indicate a degree of crystallinity of about 0.77. See Example 13.

An important and unique property of products produced by our process is the transverse microfibrillar spacing. Products produced by our process exhibit microstructure (transverse microfibrillar spacing) below about 150 Å that appears to be sensitive to the critical process variables and may have a direct role in the final properties of the product. The spacing between the microfibrils i.e., the transverse microfibrillar spacing, is unique in that an article produced by employing a solution stretch of at least about 3:1 exhibits a transverse microfibrillar spacing less than that which would exist in a shaped polyethylene article of substantially the same weight average molecular weight produced from a polymer solution of substantially the same polymer concentration, spun at substantially the same throughput rate and subjected to solution stretching at a ratio of less than about 3:1. From some preliminary small angle x-ray scattering investigations conducted with fiber products, we believe that products produced by our process will have a transverse microfibrillar spacing of less than about 50 Å. Our small angle scattering investigations were carried out using Cu radiation (1.54 Å, Ni filtered). In the procedure, the x-rays, directed normal to the major axis of the fiber, impact the fiber and are scattered over an angle $2\ \theta \leq 5°$. The intensity (I) of the scattered x-rays are detected over the entire angle $2\ \theta$ using a linear position sensitive proportional counter. The intensity (I) is plotted versus the angle to establish a peak intensity (indicated at a specific angle) which is characteristic of the transverse microfibrillar spacing (the spacing being calculated from Braggs Law $\lambda = 2d\ \sin\theta$, which is assumed to be correct).

As indicated in the Examples below, tradeoffs between various properties can be made in a controlled fashion with the present process.

Figure 1:
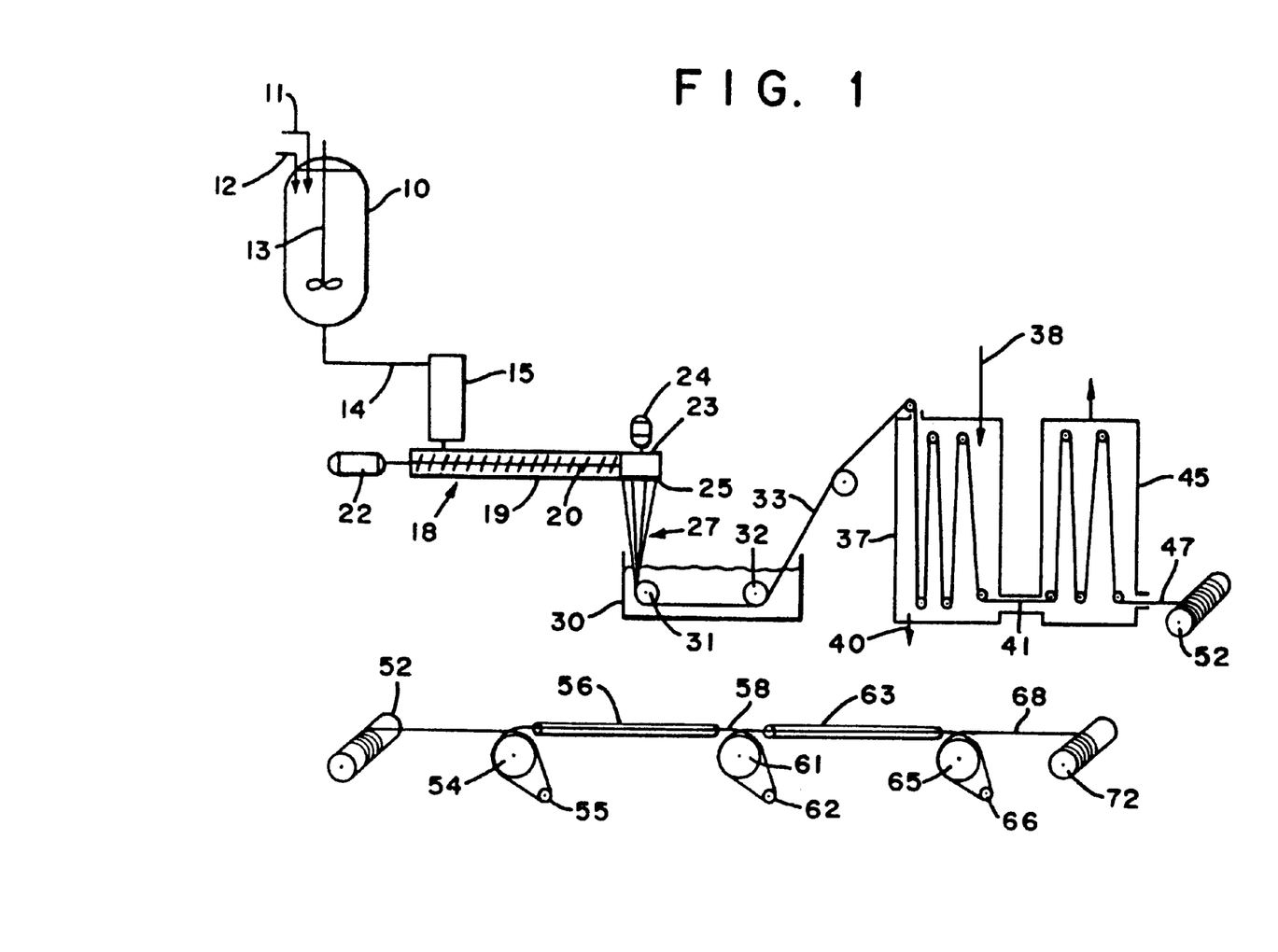
FIG. 1 illustrates in schematic form the preferred embodiment of the apparatus used to produce the novel articles.
Figure 2:
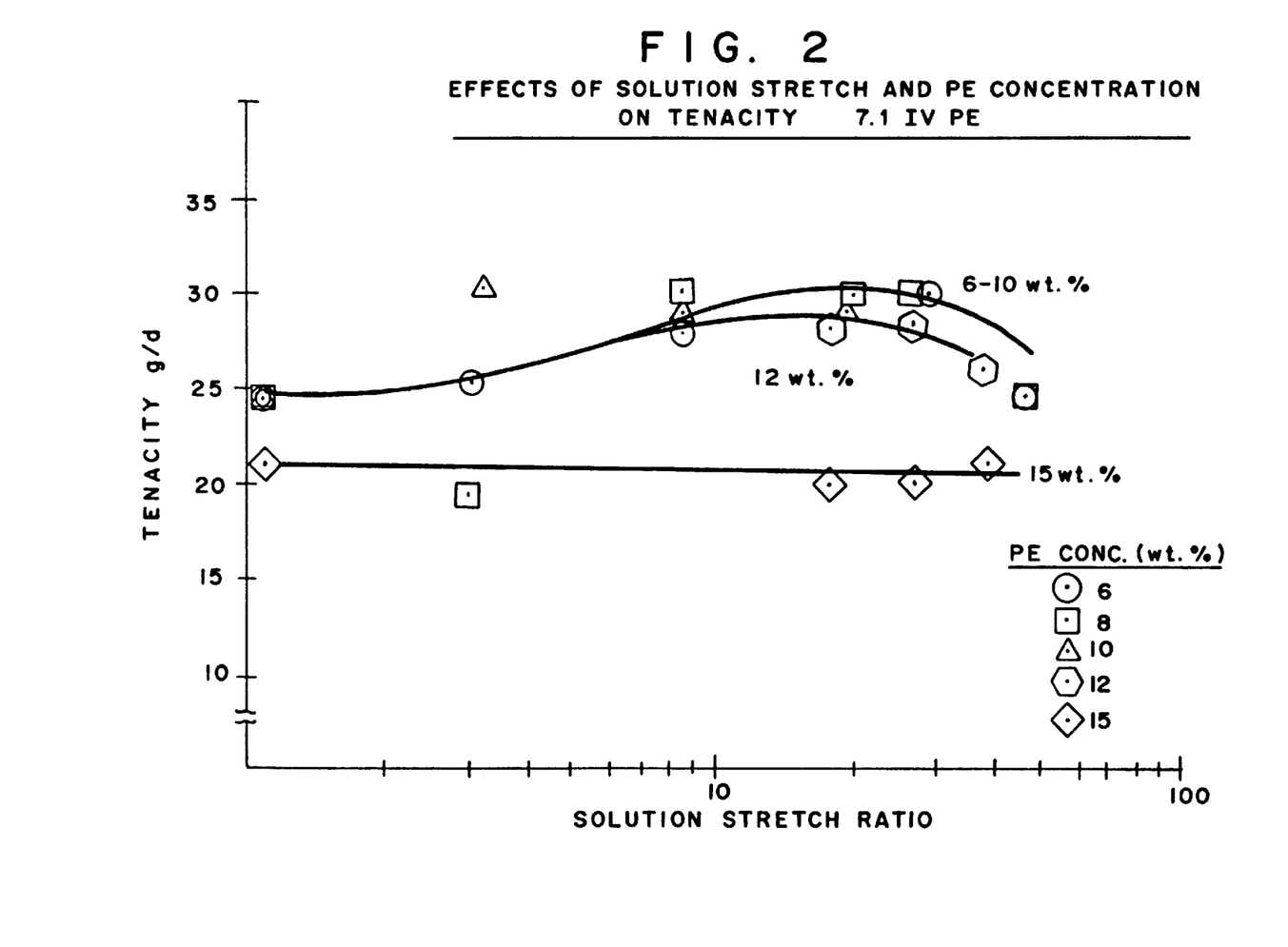
FIG. 2 graphically depicts the effects of polymer concentration and die draw ratio on fiber tenacity.

FIG. 1 illustrates in schematic form the preferred embodiment of the apparatus used to produce novel fibers, wherein the stretching steps include solution filament stretching and stretching at least two of the gel containing the first solvent, the gel containing second solvent; and, the xerogel. As shown, a first mixing vessel 10 is fed with the intermediate molecular weight polymer 11 such as polyethylene of weight average molecular weight between about 200,000 and about 4,000,000, and is also fed with a first, relatively non-volatile solvent 12 such as paraffin oil. First mixing vessel 10 is equipped with an agitator 15. The residence time of polymer and first solvent in first mixing vessel 10 is sufficient to form a slurry. The slurry is removed from first mixing vessel via line 14 to a preheater 15. The residence time and temperature in preheater 15 are sufficient to dissolve between about 5% and 50% of the polymer. From the preheater 15, the solution is fed to an extrusion device 18 containing a barrel 19 within which is a screw 20 operated by motor 22 to deliver polymer solution at reasonably high pressure to a gear pump in housing 23 at a controlled flow rate. Motor 24 is provided to drive gear pump 23 and extrude the polymer solution, still hot, through a spinnerette at 25 comprising a plurality of aperatures, which may be circular, x-shaped or oval shaped, or in any of a variety of shapes having a relatively small major access in the plane of the spinnerette when it is desired to form fibers, and having a regtangular or other shape when an extended major access in the plane of the spinnerette when it is desired to form films or tapes.

An aperture of circular cross section (or other cross section without a major axis in the plane perpendicular to the flow direction more than about 8 times the smallest axis in the same plane, such as oval, y- or x-shaped aperture) is used so that both gels will be fiber gels, the xerogel will be a xerogel fiber and the product will be a fiber. The diameter of the aperture is not critical, with representative apertures being between about 0.25 mm and about 5 mm in diameter (or other major axis). The length of the aperture in the flow direction should normally be at least about 10 times the diameter of the aperture (or other similar major access), preferably at least 15 times and more preferably at least 20 times the diameter (or other similar major access).

The temperature of the solution in the preheater vessel 15, in the extrusion device 18 and at the spinnerette 25 should all equal or exceed a first temperature (e.g., about 200° C.) chosen to exceed the gelation temperature (approximately 100° to 130° C. for polyethylene and paraffin oil). The temperature may vary (fluctuating between about 200° C. and 220° C.) or maybe constant (e.g., about 220° C.) from the preheater vessel 15 to the extrusion device 18 to the spinnerette 25. At all points, however, the concentration of polymer in the solution should be substantially the same. The number of aperatures in thus the numbers of fibers formed, is not critical, with convenient number of fibers being 16, 19, 120 or 240.

From the spinnerette 25, the polymer solution passes through an airgap 27, optionally enclosed and filled with an inert gas such as nitrogen, and optionally provided with a flow of gas to facilitate cooling. A plurality of solution fibers 28 containing first solvent pass through the airgap 27 and into a quench bath 30 so as to cool the fibers, both in the airgap and in the quench bath 30 to a second temperature at which the solubility of the polymer in the first solvent is relatively low, such that the polymer solution forms a gel. Prior to gelation, solution fiber stretching occurs in the airgap 27 at a ratio of at least about 3:1. This high stress draw of the solution fibers prior to gelation is critical in achieving the ultimate properties of the fibers.

Rollers 31 and 32 in the quench bath operate to feed the fiber through the quench bath and operate in relation to the solution fiber rate of extrusion (determined by the length of extruded fiber per unit time) at an angular velocity sufficient to stretch the solution filament at a ratio of at least about 3:1 prior to gelation. As between rollers 31 and 32, it is contemplated that stretching of the gel filament may be desired. Normally, the degree of stretch imparted between roll 31 and 32 to the gel fiber would be more than about 1.5:1. In the event that stretching of the gel fiber between rollers 31 and 32 is desired, some of first solvent may exude out of the fibers and can be collected as a layer in quench bath 30. From the quench bath 30, the cool first solvent containing gel fibers (first gel fibers) 33 passed to a solvent extraction device 37 where a second solvent, being of relatively low boiling point, such as trichlorotrifluoroethane, is fed in through line 38. The solvent outflow through line 40 contains second solvent and substantially all of the first solvent from the cool first gel fibers 33. The polymer is now swollen by the second solvent. Thus, second solvent containing gel fibers (second gel fibers) 41 conducted out of the solvent extraction device 37 contain substantially only second solvent, and relatively little first solvent. The second gel fibers 41 may have shrunken somewhat compared to the first gel fibers 33, but otherwise have substantially the same polymer morphology.

In a drying device 45, the second solvent is evaporated from the second gel fibers 41 forming essentially unstretched xerogel fibers 47 which are taken up on spool 52.

From spool 52, or from a plurality of spools if it is desired to operate a stretching line at a slower feed rate than the take up line of spool 52 permits, the fibers are fed over driven feed roll 54 and idler roll 55 into a first heated tube 56 which may be rectangular, cylindrical or any other convenient shape. Sufficient heat is supplied to the tube 56 to cause the internal temperature to be between about 115° C. and 135° C. The fibers may be stretched at this stage if desired. In this embodiment stretching would occur at a relatively high ratio (generally more than about 2:1, preferably about 3:1) so as to form partially stretched fibers 58 taken out by a driven roll 61 and idler roller 62. From rolls 61 and 62, the fibers are taken through a second heated tube 63, heated so as to be at somewhat higher temperature, e.g., 130° C. to about 155° C., and are then taken up by driven takeup roll 65 and idler roll 66. The driven takeup roll 65 is capable of operating at a sufficient speed to impart a desired stretch ratio to the gel fibers in heated tube 63 (normally more than about 1.1:1, preferably between about 1.2:1 and about 1.7:1). The twice stretched fiber 68 produced in this embodiment are taken up on takeup spool 72.

With reference to FIG. 1, the seven process steps of the invention can be seen. The solution forming step (a) is conducted in preheater 15 and extrusion device 18. The extrusion step (b) is conducted with device 18 and 23, and especially through spinnerette 25. The solution product stretching step (c) is generally conducted in the airgap 27, and the cooling and quenching step (d) is conducted in the airgap 27 and in the quench bath 30. Extraction step (e) is conducted in solvent extraction device 37. The drying step (f) is conducted in the drying device 45. The stretching step (g) is preferably conducted in elements 52–72, and especially in heated tubes 56 (Zone 1) and 63 (Zone 2). It will be appreciated however, that various other parts of the system may also perform some stretching, even at temperatures substantially below those of heated tubes 56 and 63. As noted before, stretching may occur within the quench bath 30, within the solvent extraction device 37, within drying device 45 and/or between solvent extraction device 37 and drying device 45.

EXAMPLE 1

XEROGEL YARN PREPARATION

An oil jacketed double Helical (Helicone®) mixer, constructed by Atlantic Research Corporation, was charged with 10 wt % linear polyethylene, 89.5 wt % mineral oil (Witco "Kaydol"), and 0.5 wt % antioxidant (Shell "Ionol").

The linear polyethylene was Allied Corporation FD60-018 having an intrinsic viscosity (IV) of 3.7 measured in decalin at 135° C., a weight average molecular weight of 284,000 kg/mol and an Mw/Mn of approximately 10. The charge was heated with agitation at 60 rpm to 240° C. The bottom discharge opening of the Helicone mixer was adapted to feed the polymer solution first to a gear pump and then to a 19-hole spinning die. The holes of the spinning die were each of 0.040" diameter. The gear pump speed was set to deliver 15.2 cm$^3$/min polymer solution to the die. The extruded solution filaments were stretched 39.8:1 in passing through a 2" air gap into a water quench bath at 15° C. wherein the filaments were quenched to a gel state.

The gel "yarn" was passed into a washer cabinet in which the mineral oil content of the gel filaments was extracted and replaced by trichlorotrifluoroethane (TCTFE) at 35° C. The gel yarn was stretched 1.14:1 in traversing the washer. The extracted gel yarn was passed into a dryer cabinet where the TCTFE was evaporated from the yarn at 60° C. The dried yarn was stretched 1.14:1 at 60° C. as it exited the dryer cabinet. The extracted and dried xerogel yarn of 173 denier was wound onto a roll at 63.2 meters/min.

EXAMPLES 2–9

HOT STRETCHING

The roll of xerogel yarn from Example 1 was transferred to a two-zone stretch bench. Each zone consisted of a 10-ft long heated tube maintained at uniform temperature and under nitrogen blanketing. The xerogel yarn was fed into the first stage at 16 m/min. Other stretch conditions and the properties of the yarns obtained are given in Table 2.

TABLE 2

| | ZONE TEMPS, ° C. | | STRETCH RATIOS | |
|---|---|---|---|---|
| Example | #1 | #2 | #1 | #2 |
| 2 | 120 | 136 | 3.0 | 1.5 |
| 3 | 120 | 135 | 3.0 | 1.5 |
| 4 | 120 | 145 | 2.9 | 1.6 |
| 5 | 120 | 145 | 2.9 | 1.7 |
| 6 | 125 | 140 | 3.0 | 1.5 |
| 7 | 129 | 145 | 2.75 | 1.35 |
| 8 | 129 | 145 | 2.75 | 1.45 |
| 9 | 130 | 145 | 3.0 | 1.5 |

| Example | Denier | Tenacity | Modulus g/d | % UE | W-t-B* J/g |
|---|---|---|---|---|---|
| 2 | 47 | 14 | 490 | 5.5 | 43 |
| 3 | 52 | 13 | 460 | 6.0 | 46 |
| 4 | 40 | 13 | 470 | 7.2 | 59 |
| 5 | 45 | 12 | 430 | 8.2 | 64 |
| 6 | 34 | 14 | 550 | 5.6 | 46 |
| 7 | 40 | 12 | 380 | 9.2 | 77 |
| 8 | 38 | 12 | 410 | 8.2 | 66 |
| 9 | 31 | 15 | 490 | 8.7 | 83 |

*W-t-b is the work needed to break the fiber.

The melting temperatures of the yarns of examples 6 and 9 were determined using a Perkin-Elmer DSC-2 Differential Scanning Calorimeter. Samples of about 3.2 mg were heated in argon at the rate of 10° C./min. The yarns showed a doublet endotherm in duplicate runs:

Example 6 142° C. (main)+146° C.

Example 9 140° C. (main)+148° C.

EXAMPLES 10–31

XEROGEL YARN PREPARATION AND HOT STRETCHING

The xerogel yarns of the following examples were prepared from solutions of polyethylene (Mitsui HI-ZEX 145M-60) having a 7.1 IV (a weight average molecular weight φ 649,000 kg/mole) and an Mw/Mn of approximately 8. The xerogel yarns were prepared essentially as in Example 1 except that the spinning solution concentrations, the pumping rate, the stretch of the solution yarns and the stretch of the gel yarns were varied as illustrated in Table 3. The gel yarn stretch ratios employed in Examples 10–31 were generally the highest that could be employed consistent with either of two constraints: breakage of the yarn, or physical limitations of the apparatus used. In general, physical limitations of the apparatus limited the gel yarn stretch ratio that could be employed with yarns spun with a solution stretch of above about 20:1. Therefore, the gel yarn stretch ratios recited in the Examples should not be construed as fundamental limitations of the process as higher gel stretch ratios can be employed.

TABLE 3

| | Solution | Pumping | Stretch Ratios | |
|---|---|---|---|---|
| Example | Conc., Wt % | Rate cm$^3$/min | Solution Yarn | Gel Yarn |
| 10 | 6 | 38 | 1.1 | 9.02 |
| 11 | 6 | 38 | 3.1 | 4.5 |
| 12 | 6 | 15.2 | 8.8 | 3.39 |

TABLE 3-continued

| | | | | |
|---|---|---|---|---|
| 13 | 6 | 15.2 | 8.8 | 3.39 |
| 14 | 6 | 15.2 | 29.0 | 1.85 |
| 15 | 6 | 15.2 | 46.6 | 1.15 |
| 16 | 8 | 38 | 1.1 | 9.62 |
| 17 | 8 | 15.2 | 3.16 | 5.61 |
| 18 | 8 | 15.2 | 8.65 | 3.4 |
| 19 | 8 | 15.2 | 36.8 | 1.46 |
| 20 | 10 | 38 | 1.09 | 8.44 |
| 21 | 10 | 29.2 | 3.25 | 7.34 |
| 22 | 10 | 12.8 | 8.74 | 7.43 |
| 23 | 10 | 16.4 | 19.4 | 2.78 |
| 24 | 12 | 38 | 1.1 | 8.94 |
| 25 | 12 | 15.2 | 18.1 | 2.97 |
| 26 | 12 | 15.2 | 26.7 | 2.02 |
| 27 | 12 | 15.2 | 38.2 | 1.41 |
| 28 | 15 | 15.6 | 1.1 | 8.6 |
| 29 | 15 | 15.6 | 18.2 | 3.0 |
| 30 | 15 | 15.2 | 26.7 | 2.0 |
| 31 | 15 | 15.6 | 38.6 | 1.39 |

| | | Stretch Ratios | | |
|---|---|---|---|---|
| Example | Leaving Dryer | Zone No. 1 @ 120° C. | Zone No. 2 @ 145° C. | Overall |
| 10 | 1.24 | 3.0 | 1.35 | 50 |
| 11 | 1.3 | 3.75 | 1.4 | 95 |
| 12 | 1.22 | 2.9 | 1.4 | 147 |
| 13 | 1.22 | 2.9 | 1.5 | 158 |
| 14 | 1.14 | 3.6 | 1.4 | 308 |
| 15 | 1.14 | 3.5 | 1.4 | 299 |
| 16 | 1.25 | 3.3 | 1.2 | 52 |
| 17 | 1.26 | 4.5 | 1.3 | 131 |
| 18 | 1.20 | 4.0 | 1.3 | 184 |
| 19 | 1.14 | 5.5 | 1.4 | 472 |
| 20 | 1.24 | 2.75 | 1.4 | 44 |
| 21 | 1.17 | 3.0 | 1.5 | 126 |
| 22 | 1.14 | 2.75 | 1.4 | 285 |
| 23 | 1.14 | 3.9 | 1.5 | 360 |
| 24 | 1.31 | 2.75 | 1.4 | 50 |
| 25 | 1.14 | 3.0 | 1.5 | 276 |
| 26 | 1.14 | 2.8 | 1.4 | 241 |
| 27 | 1.14 | 3.5 | 1.4 | 301 |
| 28 | 1.19 | 2.5 | 1.2 | 34 |
| 29 | 1.14 | 2.25 | 1.5 | 196 |
| 30 | 1.14 | 2.25 | 1.5 | 205 |
| 31 | 1.14 | 3.0 | 1.3 | 239 |

The xerogel yarns were hot stretched as in Examples 2–9. Zone No. 1 temperature was maintained at 120° C. and Zone No. 2 temperatures was 145° C. The stretch ratios and the properties of the yarns obtained are given in Table 4.

TABLE 4

| Example | Denier | Tenacity g/d | Modulus g/d | % UE | W-t-B[1] J/g | Melting Temps ° C.* |
|---|---|---|---|---|---|---|
| 10 | 119 | 24 | 1100 | 3.5 | 47 | — |
| 11 | 65 | 26 | 1380 | 3.7 | 54 | — |
| 12 | 41 | 30 | 1340 | 3.7 | 63 | 146, 151 |
| 13 | 46 | 29 | 1030 | 4.4 | 73 | — |
| 14 | 20 | 29 | 1480 | 3.3 | 58 | 146, 151 |
| 15 | 19 | 24 | 1040 | 4.1 | 56 | 134, 146, 148 |
| 16 | 187 | 24 | 1100 | 3.5 | 46 | 146, 151 |
| 17 | 90 | 19 | 790 | 4.4 | 49 | — |
| 18 | 50 | 30 | 1380 | 4.0 | 69 | — |
| 19 | 16 | 30 | 1180 | 4.5 | 74 | 146, 151 |
| 20 | 289 | 24 | 1040 | 3.9 | 50 | — |
| 21 | 84 | 31 | 1280 | 4.6 | 80 | 146, 151 |
| 22 | 45 | 28 | 1030 | 4.4 | 66 | — |
| 23 | 33 | 28 | 860 | 4.8 | 74 | — |
| 24 | 291 | 24 | 1290 | 3.5 | 47 | — |
| 25 | 43 | 28 | 1050 | 5.2 | 81 | 142, 150 |
| 26 | 44 | 28 | 870 | 6.1 | 90 | — |
| 27 | 44 | 27 | 840 | 6.5 | 96 | 144, 149 |
| 28 | 510 | 21 | 880 | 4.3 | 47 | — |
| 29 | 92 | 20 | 640 | 5.8 | 61 | — |
| 30 | 84 | 20 | 680 | 6.3 | 64 | — |
| 31 | 45 | 22 | 650 | 5.4 | 60 | — |

*Main melting peak is underlined
[1]W-t-b is the work needed to break the fiber.

It is seen from the data of Examples 10–31 that yarn tenacity, modulus, elongation, toughness and melting temperatures may be regulated through a choice of solution concentration, solution stretch ratio, gel stretch ratio and xerogel stretch ratios. The yarn properties are also functions of polymer IV and the respective stretch temperatures and speeds. The final product of Example 13 was characterized by x-ray diffraction, heat of fusion, density, and infra-red dichroic measurements at 720 and 730 cm$^{-1}$. The results are as follows:

a) density (Kg/m$^3$): 961 b) heat of fusion (cal/g): 59.6 c) x-ray crystallinity index: 0.65 d) crystalline orientation function ($f_c$): 0.992 e) overall infra-red fiber orientation function: 0.84

Figure 3:
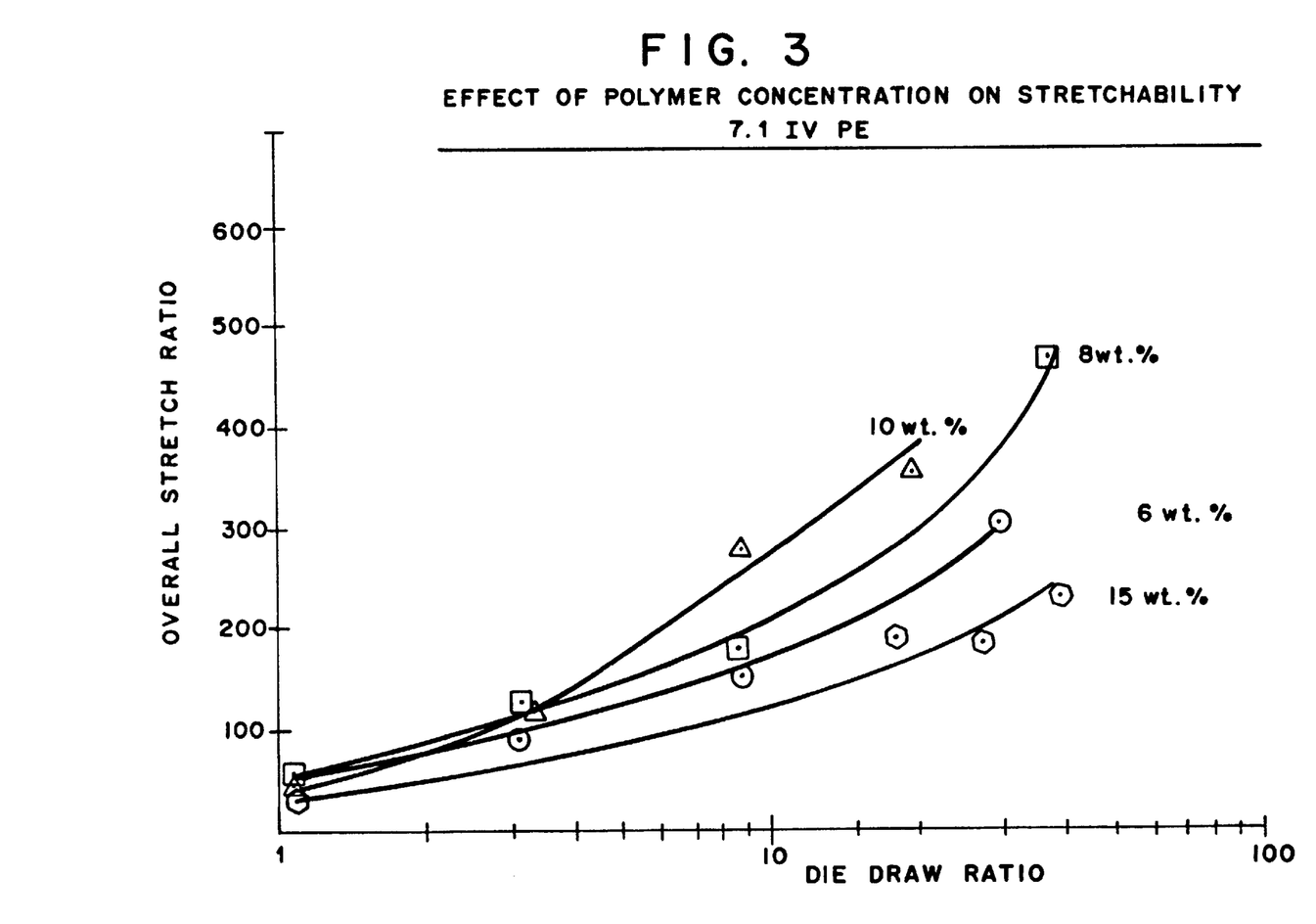
FIG. 3 graphically shows the effects of polymer concentration and die draw ratio on the overall stretchability of fibers.

The tenacity data of Examples 10–31 are shown plotted vs. solution stretch ratio in FIG. 3. Examples 10, 16, 20, 24 and 28 are comparative examples of fiber samples not subject to a solution stretch of at least about 3:1. Surprisingly, it is apparent from the plot that for this 7.1 IV polymer essentially the same tenacity-solution stretch ratio relationship applies for polymer concentrations of from 6 wt % to 10 wt %.

In FIG. 4, the overall stretch ratios obtained in Examples 10–31 are shown plotted vs. solution stretch ratio and as a function of polymer concentration. Very surprisingly, the stretchability (overall stretch ratio) increased with increasing polymer concentration over the concentration range 6 wt %–10 wt %. This feature is contrary to reports in the literature which clearly indicate that as concentration levels increase, the overall stretchability of the fiber should decrease. See Smith, Lemstra & Booij, Journal of Polymer Science, Poly. Phys. Ed., 19, 877 (1981). While the causes of the opposite effect indicated by our results as compared to the results reported in Smith et al., supra, are not entirely clear, it appears that this opposite effect results from the sequence of processing steps employed in our process (which produces a more uniform fiber).

Our results indicate that solution stretching at a ratio of at least 3:1 tends to cause molecular disentanglement. Because this feature competes with the opposing tendency of greater entanglement with increasing polymer concentration, we believe that optimum overall stretchability occurs at intermediate solution stretch ratios and intermediate first concentrations.

EXAMPLES 32–36

The xerogel yarns of the following examples were prepared from a 6 wt % solution of polyethylene (Hercules HB-301) having a 9.0 IV, approximately 998,000 Mw, and an Mn/Mm of approximately 8. The yarns were spun essentially as in Example 1 except that the solution yarns and gel yarns were stretched as recited in Table 5. Pumping rate was 38 cm/min in Examples 32 and 33 and was 17.3 cm³/min in Examples 34–36.

The xerogel yarns were hot stretched as in Examples 2–9. Zone No. 1 temperature was maintained at 135° C. and zone No. 2 temperature was 150° C. Feed speed to the first hot stretch zone was 12 m/min in Example 32, 24 m/min in Example 33 and 16 m/min in Examples 34–36. The stretch ratios and the properties of the yarns obtained are also given in Table 5.

TABLE 5

| | | | Stretch Ratios | | |
|---|---|---|---|---|---|
| Example | Solution Yarn | Gel Yarn | Leaving Dryer | Zone No. 1 @ 135° C. | Zone No. 2 @ 150° C. | Overall |
| 32 | 1.08 | 8.14 | 1.3 | 3.25 | 1.2 | 45 |
| 33 | 1.08 | 8.14 | 1.3 | 2.5 | 1.2 | 34 |
| 34 | 12.95 | 3.65 | 1.15 | 3.0 | 1.2 | 196 |
| 35 | 19.8 | 2.38 | 1.15 | 3.0 | 1.25 | 203 |
| 36 | 40.0 | 1.18 | 1.15 | 3.0 | 1.25 | 203 |

| Example | Denier | Tenacity g/d | Modulus g/d | % UE | W-t-B* j/g |
|---|---|---|---|---|---|
| 32 | 151 | 22 | 1120 | 2.9 | 35 |
| 33 | 149 | 25 | 1160 | 3.3 | 43 |
| 34 | 28 | 31 | 1360 | 3.7 | 63 |
| 35 | 26 | 32 | 1370 | 3.7 | 64 |
| 36 | 21 | 29 | 1040 | 4.2 | 65 |

*W-t-b is the work needed to break the fiber.

EXAMPLES 37–47

The following examples illustrate that the maximum attainable solution stretch and the effects of solution stretch are dependent on polymer molecular weight, solution concentration and spinning throughput rate.

In these examples, polyethylene solutions were prepared as in Example 1 except that the polymer was of 26 IV, approximately 4.5×10⁶ Mw, and Mw/Mn of approximately 8. The solutions were spun through a 16 hole spinning die whose holes were of 0.040" diameter. The pumping rate was 16 cm³/min in Examples 37–39 and 41, 32 cm³/min in Example 40, and 48 cm³/min in Examples 42–47.

TABLE 6

| | | Stretch Ratios | | |
|---|---|---|---|---|
| Example | Solution Yarn | Gel Yarn | Zone No.1 @ 135° C. | Zone No.2 @ 150° C. | Overall |
| 37 | 0.61 | 6.78 | 5.25 | 2.0 | 43 |
| 38 | 11.21 | 5.6 | 4.75 | 2.0 | 64 |
| 39 | 3.05 | 3.1 | 5.5 | 2.0 | 104 |
| 40 | 5.56 | 1.0 | 4.75 | 3.0 | 79 |
| 41 | 10.0 | 1.0 | 4.5 | 2.5 | 112 |
| 42 | 11.0 | (BROKE) | | | |
| 43 | 1.08 | 3.7 | 5.75 | 2.25 | 52 |
| 44 | 1.48 | 2.58 | 5.0 | 2.5 | 48 |
| 45 | 2.25 | 1.95 | 5.35 | 2.5 | 59 |
| 46 | 3.82 | 1.0 | 5.0 | 2.75 | 52 |
| 47 | 4.0 | (BROKE) | | | |

| Example | Denier | Tenacity | Modulus g/d | % UE | W-t-B* j/g |
|---|---|---|---|---|---|
| 37 | 174 | 31 | 1620 | 2.7 | 92 |
| 38 | 92 | 32 | 2250 | 2.4 | — |
| 39 | 62 | 33 | 2090 | 2.5 | — |
| 40 | 59 | 31 | 1690 | 2.7 | — |
| 41 | 38 | 33 | 1880 | 2.7 | — |
| 42 | | | | | |
| 43 | 138 | 32 | 1630 | 2.5 | — |
| 44 | 130 | 35 | 1710 | 2.8 | — |
| 45 | 99 | 32 | 1580 | 2.6 | — |
| 46 | 108 | 28 | 1160 | 3.3 | — |
| 47 | | | | | |

*W-t-b is the work needed to break the fiber.

We claim:

1. A composite article comprising polyethylene film or fiber having a weight average molecular weight between 200,000 and 4,000,000 kg/kg mole, a tensile modulus of at least 350 g/d, a tenacity of at least 13 g/d, a crystalline orientation function of at least 0.95, and a main melting temperature of at least 140° C. (measured at 10° C. per minute heating rate by differential scanning calorimetry), and subjected to solution stretching at a ratio of at least 3:1.

2. A composite article comprising polyethylene film or fiber having a weight average molecular weight between 200,000 and 4,000,000 kg/kg mole, a tensile modulus of at least 350 g/d, a tenacity of at least 13 g/d, a crystalline orientation function of at least 0.95, a main melting temperature of at least 140° C. (measured at 10° C./minute heating rate by differential scanning calorimetry), an ultimate elongation of not more than 5%, and a transverse microfibrillar spacing of less than 150 Å.

* * * * *